(12) United States Patent
Poterala et al.

(10) Patent No.: US 11,973,322 B2
(45) Date of Patent: Apr. 30, 2024

(54) SPARK GAP ASSEMBLY FOR OVERVOLTAGE PROTECTION AND SURGE ARRESTER

(71) Applicant: Hubbell Incorporated, Shelton, CT (US)

(72) Inventors: Stephen Franklin Poterala, Aiken, SC (US); Bastiaan Hubertus van Besouw, Strongsville, OH (US); Sidharth Suresh Iyer, Wadsworth, OH (US)

(73) Assignee: Hubbell Incorporated, Shelton, CT (US)

( * ) Notice: Subject to any disclaimer, the term of this patent is extended or adjusted under 35 U.S.C. 154(b) by 41 days.

(21) Appl. No.: 17/554,513

(22) Filed: Dec. 17, 2021

(65) Prior Publication Data

US 2022/0200245 A1 Jun. 23, 2022

Related U.S. Application Data

(60) Provisional application No. 63/127,468, filed on Dec. 18, 2020.

(51) Int. Cl.
*H01T 1/16* (2006.01)
*H02H 9/06* (2006.01)

(52) U.S. Cl.
CPC ............... *H01T 1/16* (2013.01); *H02H 9/06* (2013.01)

(58) Field of Classification Search
CPC .... H01T 4/06; H01T 4/20; H01T 1/16; H02H 9/06
See application file for complete search history.

(56) References Cited

U.S. PATENT DOCUMENTS

| | | | |
|---|---|---|---|
| 3,513,354 A | 5/1970 | Sakshaug et al. | |
| 3,859,568 A | 1/1975 | Sakshaug | |
| 4,004,193 A * | 1/1977 | Reckard | H02H 9/06 361/127 |
| 4,174,530 A | 11/1979 | Kresge et al. | |
| 2003/0043526 A1 | 3/2003 | Ramarge et al. | |
| 2014/0085764 A1 * | 3/2014 | Huo | H05K 13/00 361/118 |
| 2018/0076617 A1 * | 3/2018 | Boese | H02H 7/24 |
| 2018/0175616 A1 * | 6/2018 | Schneider | H01T 1/14 |

OTHER PUBLICATIONS

PCT/US2021/64067 International Search Report and Written Opinion dated Mar. 2, 2022 (18 pages).

* cited by examiner

*Primary Examiner* — Bryan R Perez
(74) *Attorney, Agent, or Firm* — Michael Best & Friedrich LLP

(57) ABSTRACT

A spark gap assembly that includes a first spark gap segment and a second spark gap segment electrically connected in series with the first spark gap segment. The first spark gap includes a first spark gap and a first grading circuit electrically connected in parallel with the first spark gap. The second spark gap segment includes a second spark gap and a second grading circuit electrically connected in parallel with the second spark gap.

23 Claims, 16 Drawing Sheets

SPARK GAP ASSEMBLY FOR OVERVOLTAGE PROTECTION AND SURGE ARRESTER

RELATED APPLICATIONS

This application claims the benefit of U.S. Provisional Patent Application No. 63/127,468, filed Dec. 18, 2020, the entire contents of which are hereby incorporated by reference.

FIELD

Embodiments relate to spark gap assemblies for overvoltage protection and surge arresters.

SUMMARY

Surge arresters, which provide a current path from a conductor to the ground, offer power systems and components protection against power surges caused by lightning, electrical switching events, and/or other causes. Surge arrester designs may include a metal oxide varistor (MOV) stack, which are highly nonlinear ceramic semiconductors that switch from an insulating state during normal operation to a conductive state in the presence of a power surge. The resistance of the MOV stack drops during a power surge such that the arrester conducts the surge current to ground. Accordingly, during a power surge, a voltage increase on the conductor may be limited to a level that will not cause damage to the power system or component.

As described above, the MOV discs included in a surge arrester are capable of protecting equipment against short duration power surges caused by lightning or electrical switching. However, the MOV discs of the surge arrester may be ineffective in protecting against sustained overvoltage conditions that occur at typical line frequencies, such as 50-60 Hz. Sustained over voltages may result in overheating of the arrester, which increases conductivity of the MOV discs and thus more power dissipation. As a result, the arrester may reach a critical temperature at which thermal runaway and short circuit faults may occur within the arrester. Short circuit faults in an arrester may lead to sever power arcing or occasionally expulsions of hot debris into the environment, creating hazardous conditions for nearby personnel and equipment.

A first aspect provides a spark gap assembly that includes a first spark gap segment and a second spark gap segment electrically connected in series with the first spark gap segment. The first spark gap includes a first spark gap and a first grading circuit electrically connected in parallel with the first spark gap. The second spark gap segment includes a second spark gap and a second grading circuit electrically connected in parallel with the second spark gap.

A second aspect provides an arrester that includes a spark gap assembly. The spark gap assembly includes a first spark gap segment and a second spark gap segment electrically connected in series with the first spark gap segment. The first spark gap includes a first spark gap and a first grading circuit electrically connected in parallel with the first spark gap. The second spark gap segment includes a second spark gap and a second grading circuit electrically connected in parallel with the second spark gap.

A third aspect provides an accessory device that is electrically connected in series with an arrester and includes a spark gap assembly. The spark gap assembly includes a first spark gap segment and a second spark gap segment electrically connected in series with the first spark gap segment. The first spark gap includes a first spark gap and a first grading circuit electrically connected in parallel with the first spark gap. The second spark gap segment includes a second spark gap and a second grading circuit electrically connected in parallel with the second spark gap.

Other aspects of the invention will become apparent by consideration of the detailed description and accompanying drawings.

DETAILED DESCRIPTION

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more electronic processors, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more electronic processors, one or more computer-readable medium modules, one or more input/output interfaces, and various connections (e.g., a system bus) connecting the components.

Figure 1:
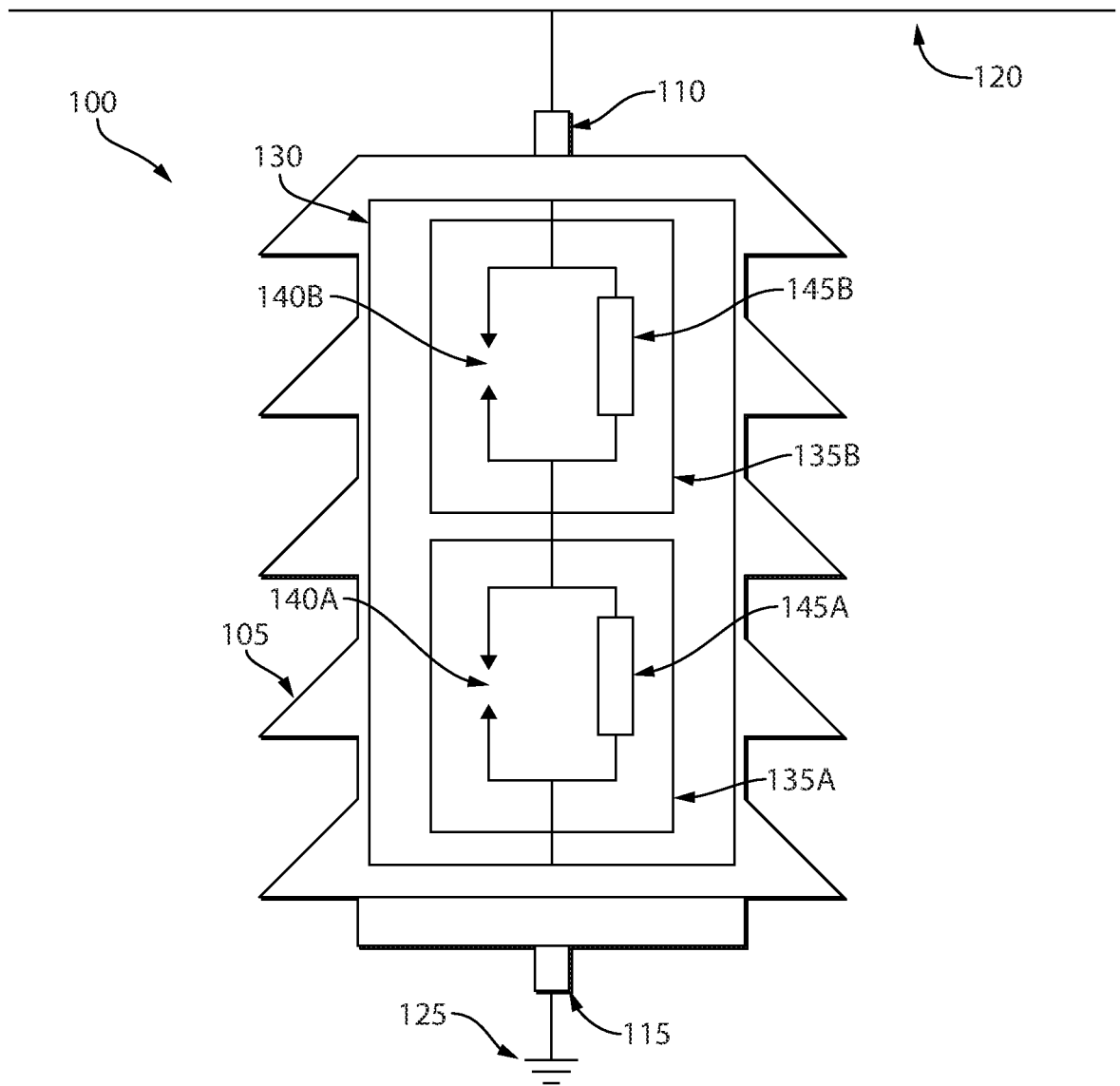
FIG. 1 illustrates a schematic diagram of an arrester according to some embodiments.

FIG. 1 illustrates an arrester, such as a surge arrester, 100 according to some embodiments of the application. The surge arrester 100 includes a housing 105, a first stud 110 extending from an upper portion of the housing 105, and a lower stud 115 extending from a lower portion of the housing 105. The first stud 110 electrically connects the surge arrester 100 to a power system 120. The second stud 115 electrically connects the surge arrester 100 to ground 125. The housing 105 may be, for example, made of any suitable material, such as, but not limited to, ceramic, glass, and/or nylon.

Figure 2:
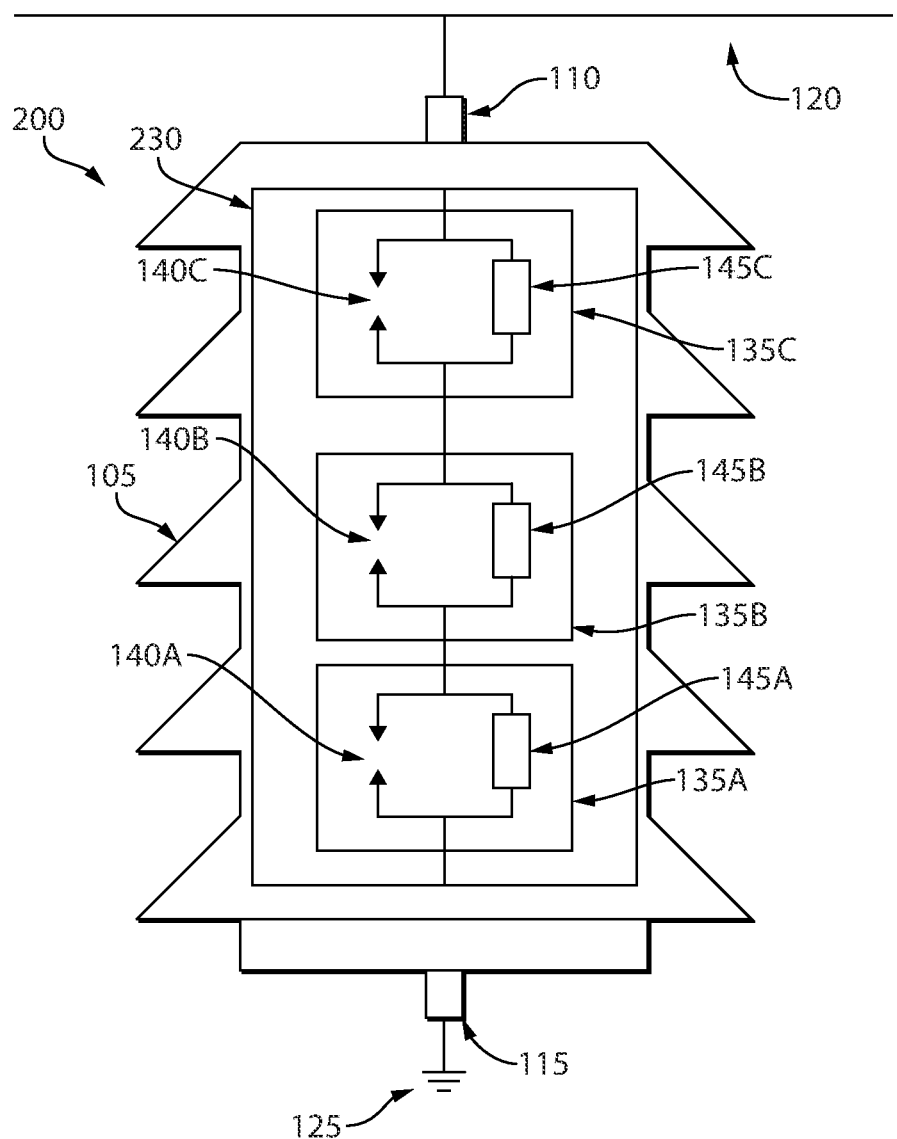
FIG. 2 illustrates a schematic diagram of an arrester according to some embodiments.

The surge arrester 100 further includes a spark gap assembly 130, which includes a plurality of spark gap segments 135A-135N electrically connected in series with one another. For example, as shown in FIG. 1, at least two spark gap segments, 135A and 135B, are included in the spark gap assembly 130. However, the spark gap assembly 130 may include any desired number, N, of spark gap segments 135A-135N. For example, FIG. 2 illustrates an embodiment of a surge arrester 200 that includes a spark gap assembly 230. The spark gap assembly 230 includes three spark gap segments 135A-135C electrically connected in series with one another. In other embodiments, a spark gap assembly may include more than three spark gap segments, such as four, five, six, or more spark gap segments.

Each spark gap segment 135 includes a respective spark gap 140 electrically connected in parallel with a respective grading circuit 145. Each grading circuit 145 may include one or more passive grading elements, such as resistors, capacitors, or inductors. For example, the first spark gap segment 135A includes a first spark gap 140A that is electrically connected in parallel with a first grading circuit 145A. Similarly, the second spark gap segment 135B includes a second spark gap 140B that is electrically connected in parallel with a second grading circuit 145B. As will be described in more detail below, a grading circuit 145 may include any number and/or combination of passive grading elements that is desired.

The spacing between, or length of, each spark gap 140 and the components included in the grading circuits 145 may be selected such that the sparkover behavior of the spark gap assembly 130 depends on the rate of change of voltage, dV/dt, across the spark gap assembly 130. For example, the spark gaps 140 may be graded such that the electric field within each spark gap 140A-140N is approximately equal while power system 120 is at a normal operating frequency (e.g., 50-60 Hz). That is, a respective grading circuit 145 electrically connected in parallel with a respective spark gap 140 may be designed such that the voltages across each spark gap 140A-140N are equal when a surge in the power system 120 occurs at a normal operating frequency.

In addition, the spark gaps 140 may be graded such that the first sparkover voltage of the spark gap assembly 130 is maximized. The first sparkover voltage is defined as the voltage across the spark gap assembly 130 at which sparkover will initially occur across one spark gap 135 within the spark gap assemblies. During a power surge event, an increase in the rate of change of voltage across the spark gap assembly 130 may result in unequal potential drops across the plurality of spark gaps 140. Furthermore, the increase in the rate of change of voltage across the spark gaps 140 may reduce the first sparkover voltage of the spark gap assembly 130.

When a first sparkover event occurs, the voltage across the spark gap assembly 130 may be reduced. That is, when current sparks over, or flows between a first one of the spark gaps 140, the remaining voltage of the spark gap assembly 130 gets re-distributed across the remaining spark gaps 140 that have not yet sparked over. If the overvoltage condition is sustained such that a continued input of surge energy is provided to the spark gap assembly 130, additional sparkover events may occur. For example, a continued input of surge energy may result in additional sparkover events, such that all gaps 140 in the assembly 130 spark over. In that case, the overall impedance of the spark gap assembly 130 would be greatly reduced.

Figure 3:
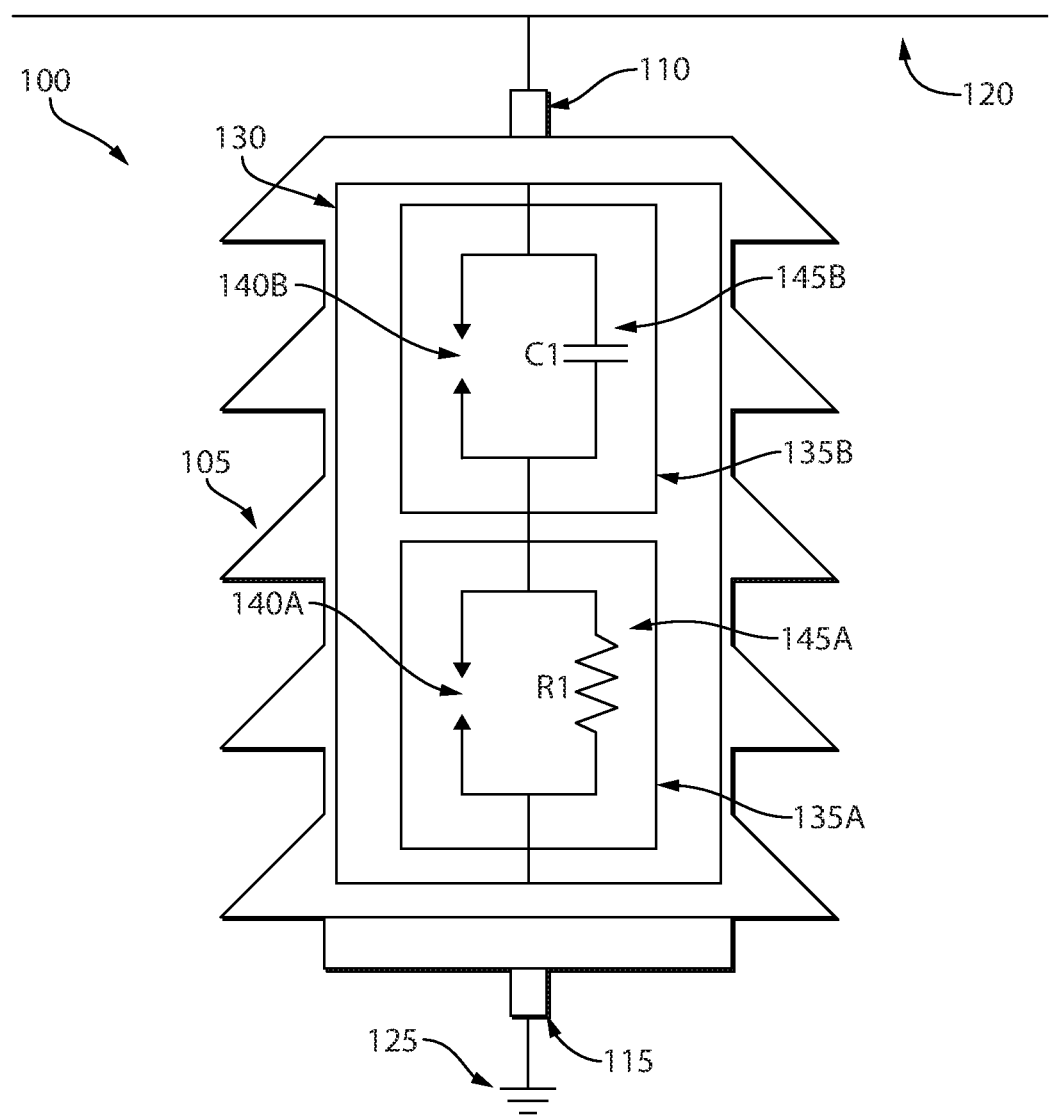
FIG. 3 illustrates an exemplary configuration of the arrester of FIG. 1.
Figure 4A:
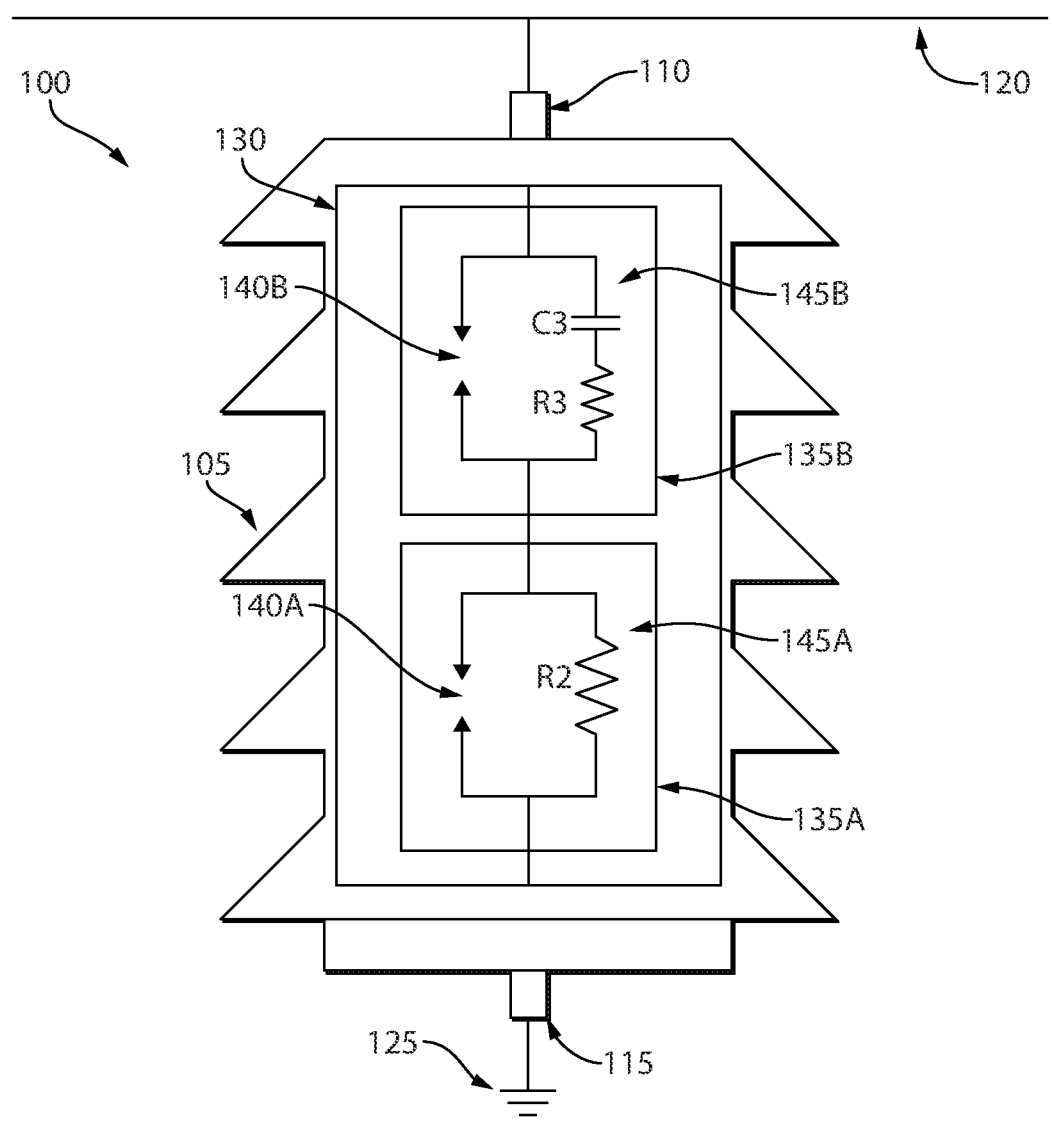
FIGS. 4A-4D illustrate exemplary configurations of the arrester of FIG. 1.
Figure 4B:
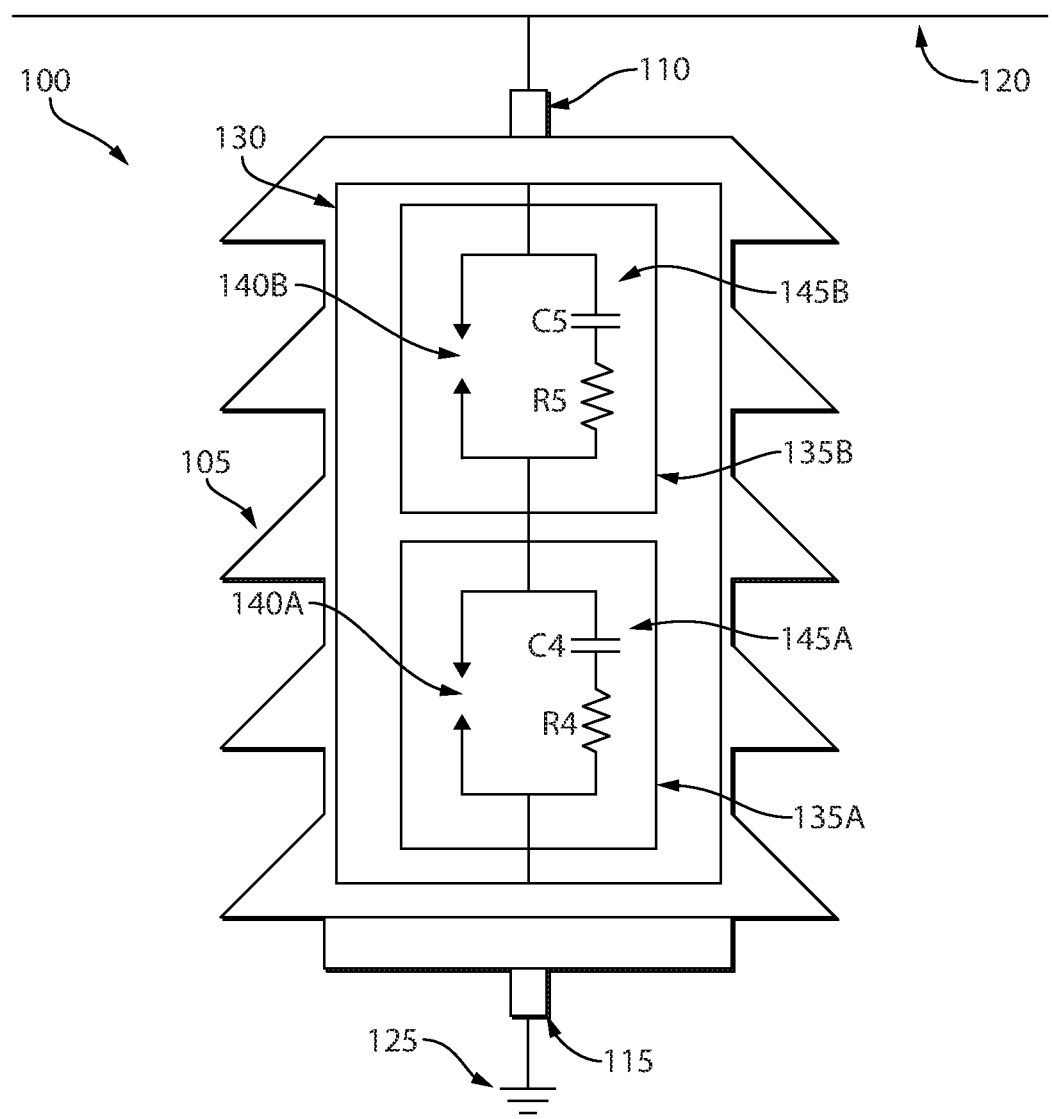
Figure 4C:
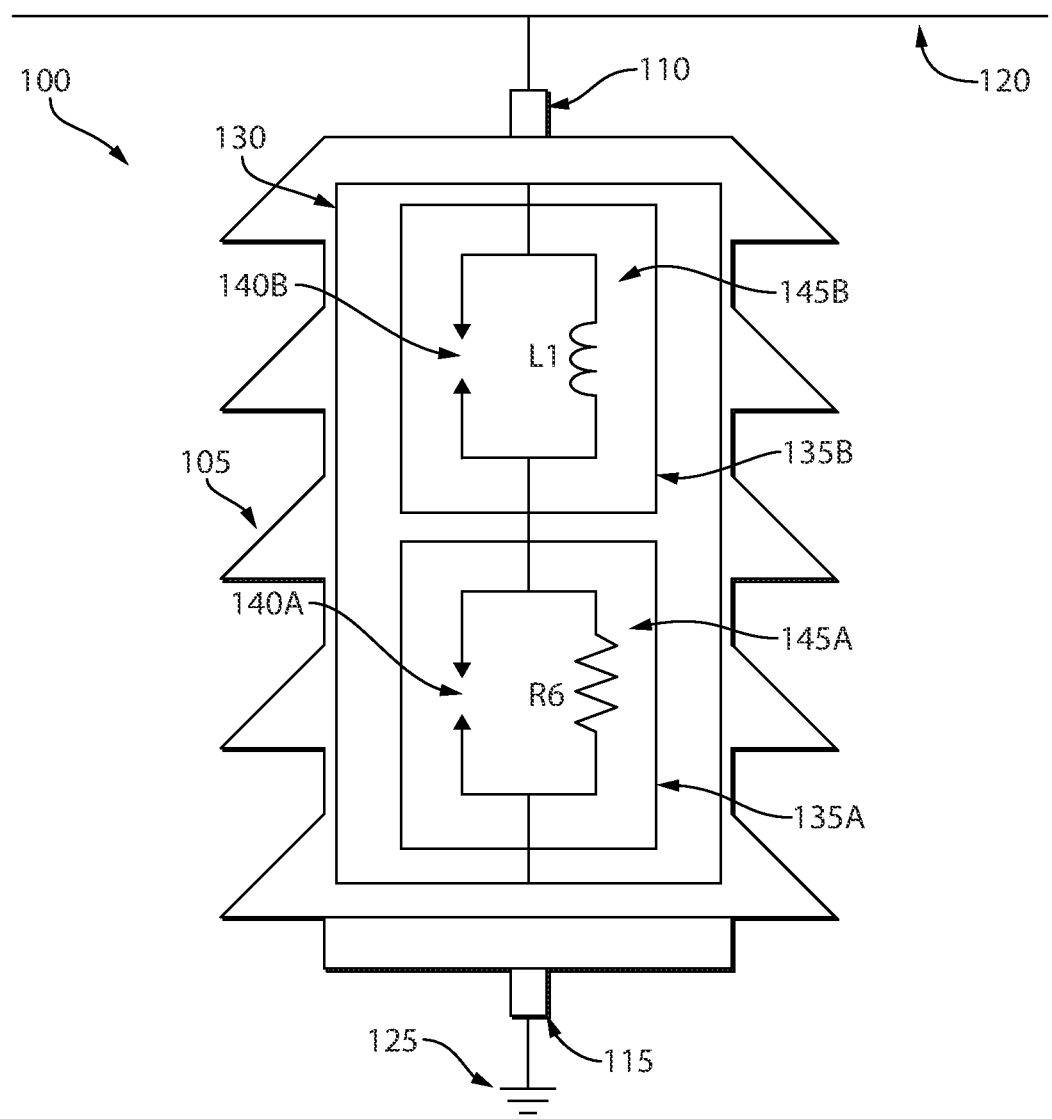
Figure 4D:
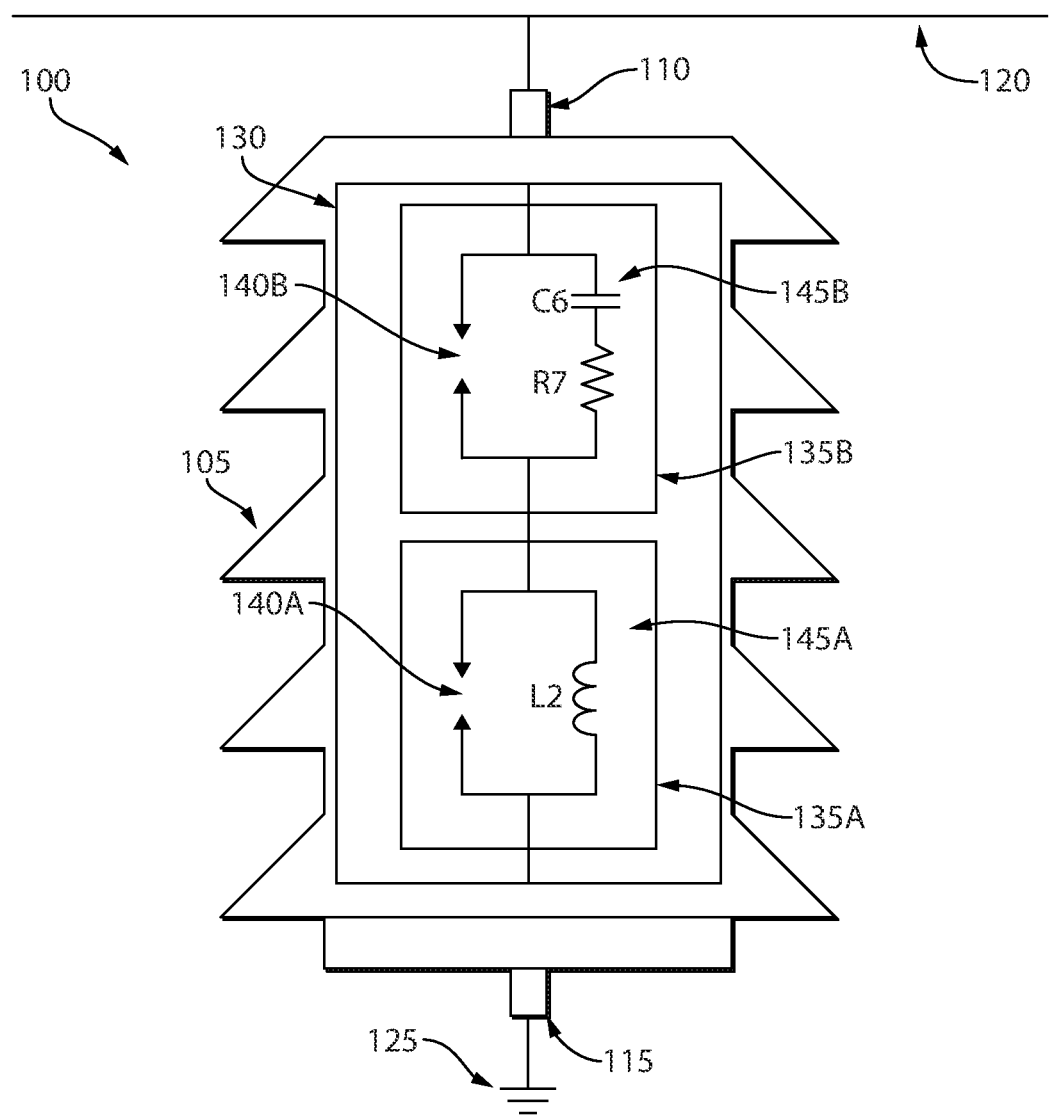

FIG. 3 illustrates an exemplary schematic of the spark gap assembly 130 included in surge arrester 100. As described above, the spark gap assembly 130 includes first and second spark gap segments 135A and 135B electrically connected in series. The first spark gap segment 135A includes a first spark gap 140A electrically connected in parallel with a first grading circuit 145A. In the illustrated embodiment, the first grading circuit 145A includes a resistor R1, and thus, the first spark gap 140A is graded by the resistor R1. In addition, the second spark gap segment 135B includes a second spark gap 140B electrically connected in parallel with a second grading circuit 145B. In the illustrated embodiment, the second grading circuit 145B includes a capacitor C1, and thus, the second spark gap 140B is graded by the capacitor C1.

The voltage $V_1$ represents the voltage drop across the first spark gap 140A. When the voltage $V_1$ is greater than or equal to the sparkover voltage $V_{S1}$ of the first spark gap 140A, a sparkover event occurs at the first spark gap 140A. Similarly, a voltage $V_2$ represents the voltage drop across the second spark gap 140B. When the voltage $V_2$ is greater than or equal to the sparkover voltage $V_{S2}$ of the second spark gap 140B, a sparkover event will occur at the second spark gap 140B.

When constructing the spark gap assembly 130, the respective spacings between the first and second spark gaps 140A and 140B may be selected to be equal or unequal. In addition, the respective values for the resistor R1 and capacitor C1 may be chosen such that resistor R1 and capacitor C1 have nearly equivalent impedances, $Z_{R1}$ and $Z_{C1}$, when the power system 120 operates at a normal operation frequency $f_0$. The value of the normal operating frequency $f_0$ is typically 50-60 Hz; however, different values may be chosen for $f_0$ depending on application of the gap assembly.

Equations 1 and 2 provided below define relationships that exist between various voltages within the spark gap assembly 130 when the power system 100 is operated at the normal operating frequency $f_0$. As defined by Equation 1, the ratio of the first voltage $V_1$ across the first spark gap 140A to the sparkover voltage $V_{S1}$ of the first spark gap 140A is approximately equal to the ratio of the voltage $V_2$ across the second spark gap 140B to the sparkover voltage $V_{S2}$ of the second spark gap 140B when voltage is applied to the surge arrester 100 at the normal operating frequency $f_0$. Furthermore, as defined by Equation 2, the voltage $V_A$ across the spark gap assembly 130 is approximately equal to the ratio of the voltage $V_1$ across the first spark gap 140A to the voltage $V_2$ across the second spark gap 140B when voltage is applied to the surge arrester 100 at the normal operating frequency $f_0$.

$$\frac{V_1}{V_{S1}} \approx \frac{V_2}{V_{S2}} \text{ at } f = f_0 \qquad \text{Equation 1}$$

$$V_A \approx \sqrt{\frac{V_1^2}{V_2^2}} \approx \frac{V_1}{V_2} \text{ at } f = f_0 \qquad \text{Equation 2}$$

By combining Equations 1 and 2 above, the first sparkover voltage $V_{AS1}$ of the spark gap assembly 130 can be determined by using Equation 3 when voltage is applied to the surge arrester 100 at the normal operating frequency $f_0$.

$$V_{AS1}(f = f_0) \approx \sqrt{\frac{(V_{S1})^2}{(V_{S2})^2}} \qquad \text{Equation 3}$$

During a surge event, either the first spark gap 140A or the second spark gap 140B may spark over first. The second sparkover voltage, $V_{AS2}$, of the spark gap assembly 130 will be equal to either $V_{S1}$ or $V_{S2}$ depending on which of the first and second spark gaps 140A, 140B sparks over first. For example, if the first spark gap 140A sparks over before the second spark gap 140B sparks over, the second sparkover voltage $V_{AS2}$ of the spark gap assembly 130 will be equal to $V_{S2}$. In contrast, if the second spark gap 140B sparks over before the first spark gap 140A sparks over, the second sparkover voltage $V_{AS2}$ of the spark gap assembly 130 will be equal to $V_{S1}$.

With reference to the spark gap assembly 130 illustrated in FIG. 3, a significant increase in the rate of change of voltage across the spark gap assembly 130 caused by a surge event increases the electrical potential across the resistively graded spark gap 140A when a surge event occurs at the normal operating frequency $f_0$. That is, the voltage $V_1$ across the first spark gap 140A is increased due to the frequency dependency of the capacitor C1's impedance $Z_{C1}$. Thus, the first sparkover voltage $V_{AS1}$ of the spark gap assembly 130 is reduced such that $V_{AS1}$ is approximately equal to $V_{S1}$, the sparkover voltage of the first spark gap 140A. Furthermore, the second sparkover voltage $V_{AS2}$ of the spark gap assembly 130 will be equal to $V_{S2}$. If the spark gap assembly 130 of FIG. 3 is constructed such that the first and second spark gaps 140A, 140B are equal in spacing, $V_{AS1}$ and $V_{AS2}$ may be reduced to approximately 71% of the value of $V_{AS1}$ when the power system 120 is operated at the normal operating frequency $f_0$.

The exemplary spark gap assembly 130 illustrated in FIG. 3 and described above may be helpful with protecting against continuous overvoltage conditions that occur at the normal operating frequency $f_0$. In addition, the exemplary spark gap assembly 130 illustrated in FIG. 3 and described above may be helpful with protecting the power system 100 against fault conditions that result in a DC voltage in the power system 100 (e.g., f=0). In such faults, the second spark gap 140B sparks over first, with $V_{AS1} \approx V_{S2}$ and $V_{AS2} \approx V_{S1}$.

It should be understood that the embodiment of the spark gap assembly illustrated by FIG. 3 is merely an example and does not limit the spark gap assembly 130 to the construction illustrated by FIG. 3. Rather, the spark gap assembly 130 may include spark gaps 140 that are graded by any number and/or combination of passive components such as resistors, capacitors, and inductors. In other words, a grading circuit 145 that is electrically connected in parallel with a given spark gap 140 may include any number and/or combination of passive grading components that is desired. FIGS. 4A-4D illustrate several additional exemplary configurations of the spark gap assembly 130. These configurations are merely intended as exemplary spark gap assembly configurations. Many other configurations that are not illustrated by FIGS. 4A-4D may also be implemented.

In the embodiments of the spark gap assembly 130 illustrated by FIGS. 4A-4D, the electrical impedance of each grading circuit 145 may be selected such that first spark over voltage $V_{AS1}$ of the spark gap assembly 130 is frequency dependent. In addition, the electrical impedance of each grading circuit 145 may be selected such that VAR is reduced by at least 25% under either a condition of impulse (f>1 kHz) or DC voltage (f=0 Hz). The use of the relatively more complex grading circuits illustrated by FIGS. 4A-4D provides advantages in limiting the power consumption of individual grading elements (e.g., resistors, capacitors, and inductors included in the grading circuits 145) during surge events. As one example, the voltage across capacitor C3 in FIG. 4A may be much less than the voltage $V_1$ across the capacitor $C_1$ of FIG. 3. Accordingly, smaller and/or less expensive capacitors can be selected for the grading circuits 145 illustrated by FIGS. 4A-4D.

FIG. 2 illustrates an embodiment of a surge arrester 200 that includes a spark gap assembly 230, which consists of three spark gap segments 135A-135C electrically connected in series. Similar to the embodiments described above and illustrated in FIGS. 1, 3, and 4A-4D, the surge arrester 200 includes a housing 105, a first stud 110 extending from an upper portion of the housing 105, and a lower stud 115 extending from a lower portion of the housing 105. The first stud 110 electrically connects the surge arrester 200 to a power system 120. The second stud 115 electrically connects the surge arrester 200 to ground 125. The housing 105 may be, for example, constructed of any suitable material, such as, but not limited to, ceramic, glass, and/or nylon.

Figure 5A:
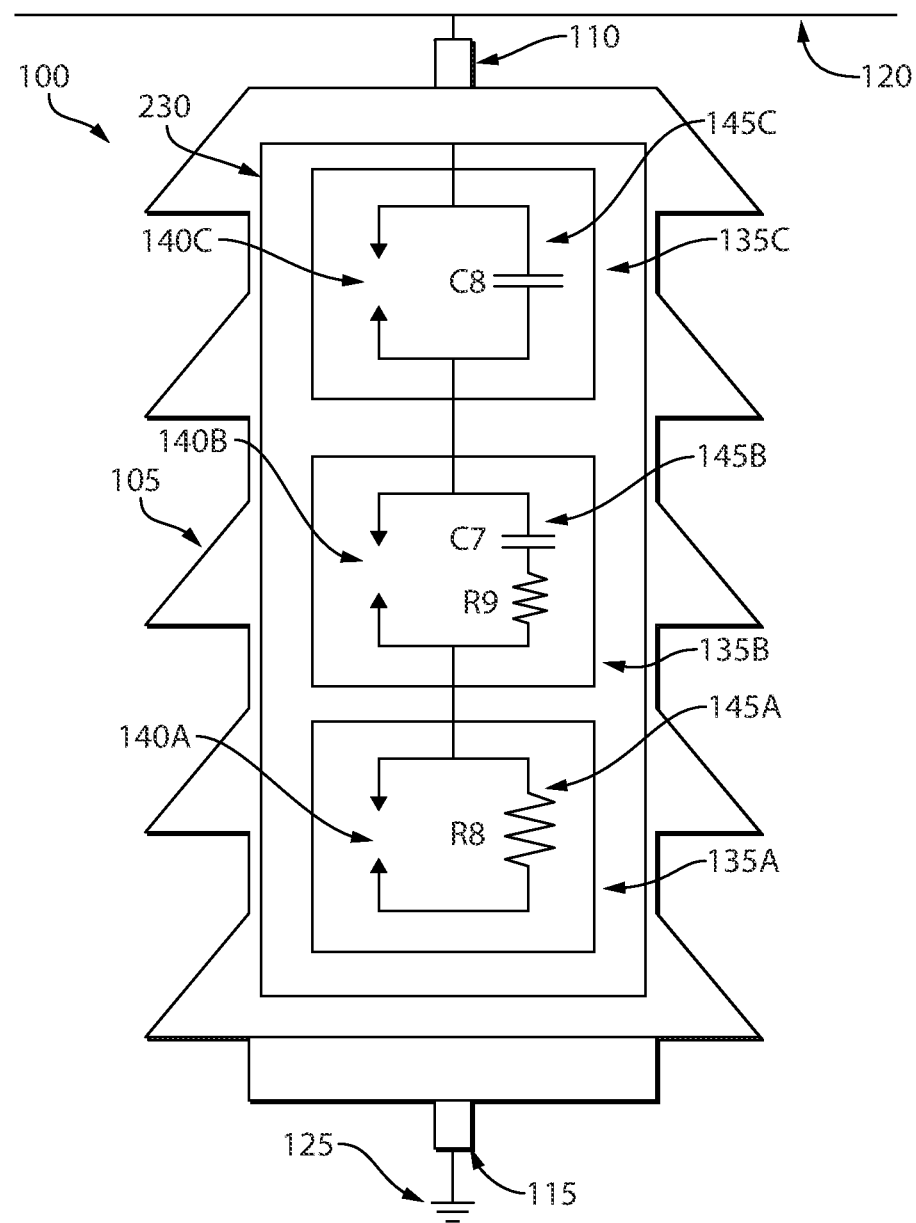
FIGS. 5A-5C illustrate exemplary configuration of the arrester of FIG. 2.
Figure 5B:
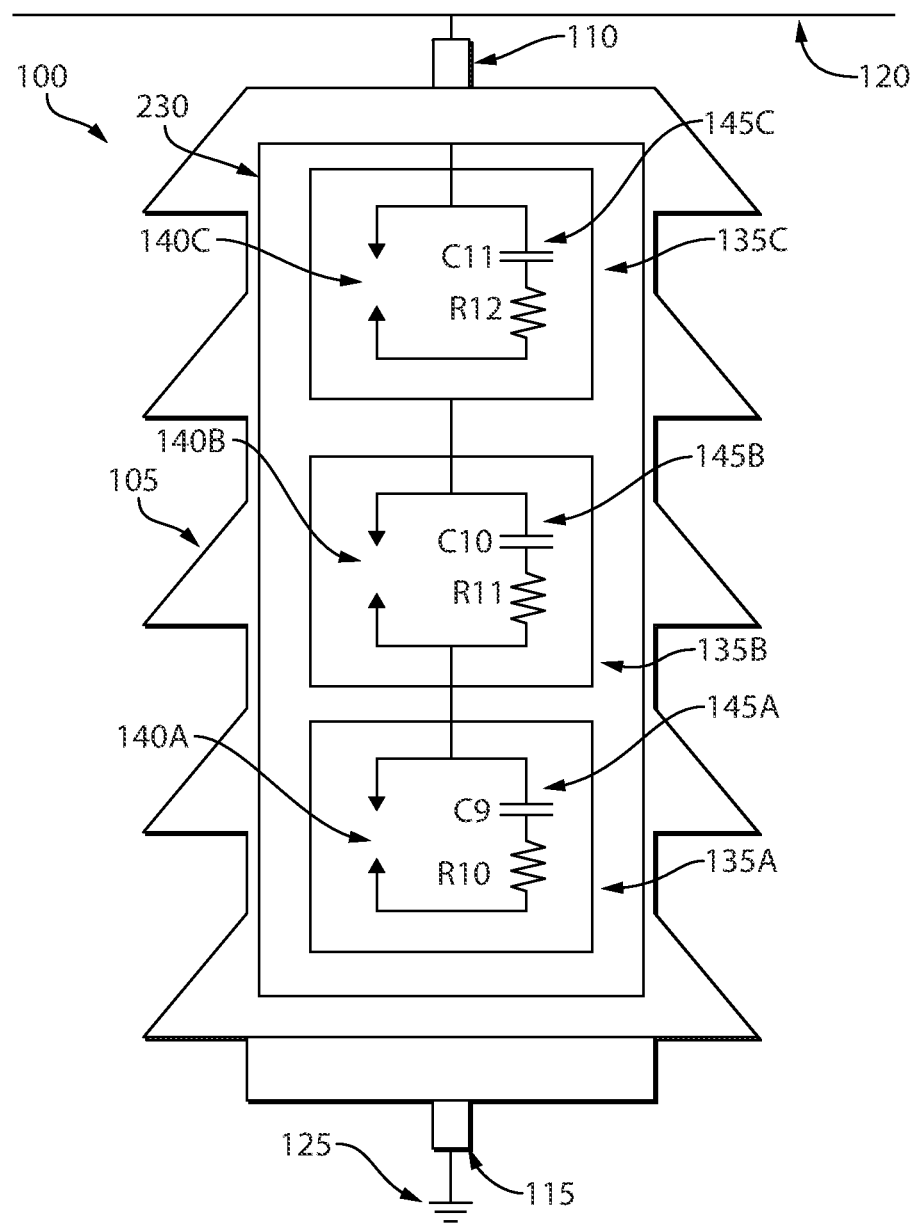
Figure 5C:
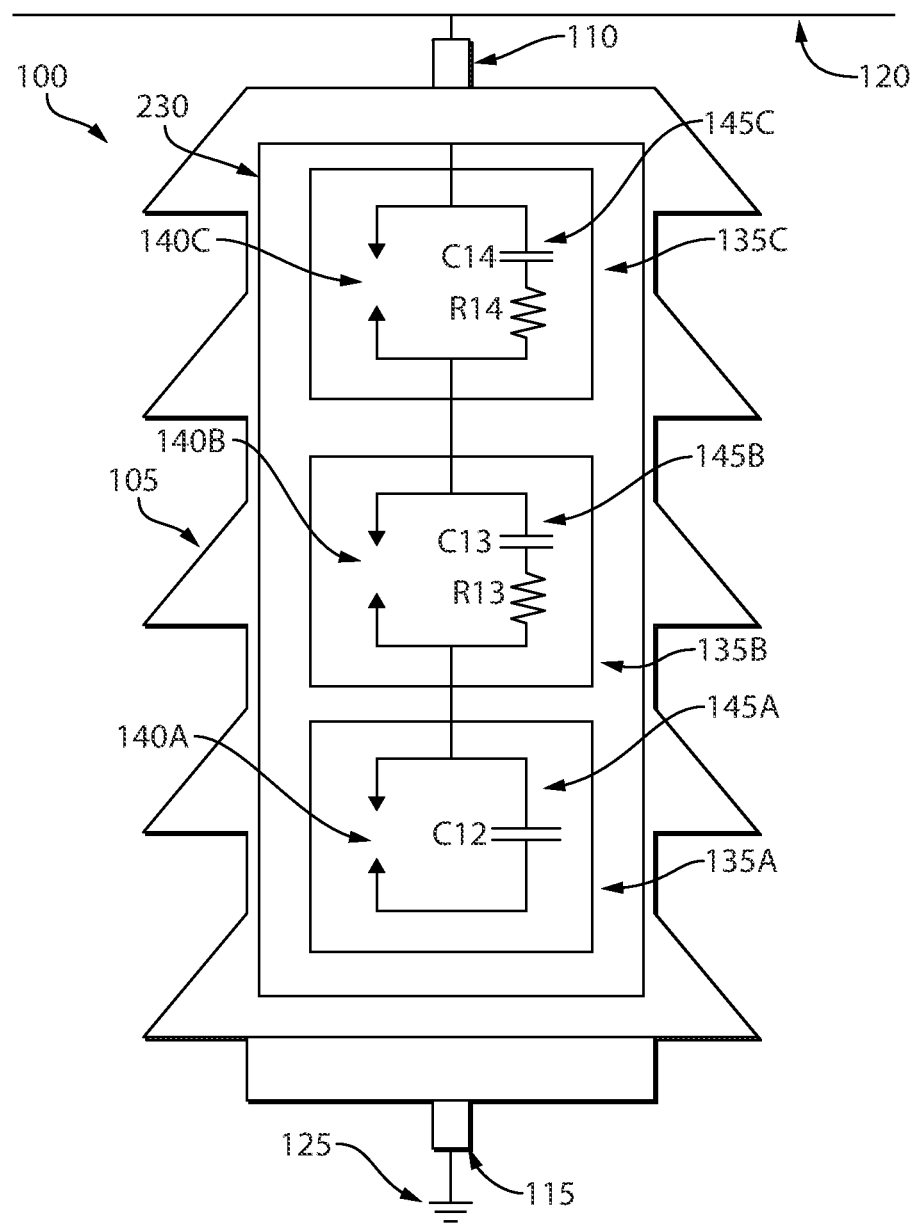

The surge arrester 200 further includes a spark gap assembly 230, which includes three spark gap segments 135A-135C electrically connected in series with one another. Although illustrated as only including three spark gap segments, it should be understood that the spark gap assembly 230 may include any desired number, N, of spark gap segments 135A-135N. Each spark gap segment 135 includes a spark gap 140 that is electrically connected in parallel with a grading circuit 145. For example, the first spark gap segment 135A includes a first spark gap 140A that is electrically connected in parallel with a first grading circuit 145A. Similarly, the second spark gap segment 135B includes a second spark gap 140B that is electrically connected in parallel with a second grading circuit 145A. Likewise, the third spark gap segment 135C includes a third spark gap 140C electrically connected in parallel with a third grading circuit 145C. The grading circuits 145A-145C may include any number and/or combination of passive grading elements (e.g., resistors, capacitors, inductors, etc.) that is desired. A FIGS. 5A-5C illustrate exemplary configurations of the spark gap assembly 230. The configurations illustrated by FIGS. 5A-5C are merely intended as exemplary configurations of the spark gap assembly 230. It should be understood that the illustrated configurations of FIGS. 5A-5C do not limit the spark gap assembly 230 in any way. Moreover, any desired number and/or combination of passive grading elements may be included in the grading circuits 145 of spark gap assembly 230.

With respect to the exemplary configuration of spark gap assembly 230 illustrated by FIG. 5A, spark gaps 140A-140C have respective spark over voltages of $V_{S11}$, $V_{S12}$, and $V_{S13}$. That is, the first spark gap 240A will spark over when the voltage $V_{11}$ across the first spark gap 140A is greater than or equal to the sparkover voltage $V_{S11}$. Similarly, the second spark gap 140B will spark over when the voltage $V_{12}$ across the first spark gap 140B is greater than or equal to the sparkover voltage $V_{S12}$. Likewise, the third spark gap 140C will spark over when the voltage $V_{13}$ across the second spark gap 140C is greater than or equal to the sparkover voltage $V_{S13}$. In the exemplary embodiment of spark gap assembly 230 illustrated by FIG. 5A, Equations 4 and 5 provided below define relationships that exist between various voltages within the spark gap assembly 230 when voltage is applied to the assembly 230 at normal operating frequency $f_0$.

$$\frac{V_{11}}{V_{S11}} \approx \frac{V_{12}}{V_{S12}} \approx \frac{V_{13}}{V_{S13}} \text{ at } f = f_0 \qquad \text{Equation 4}$$

$$\frac{V_{11}}{V_{S11}} > \frac{V_{12}}{V_{S12}} > \frac{V_{13}}{V_{S13}} \text{ at } f \gg f_0 \qquad \text{Equation 5}$$

With respect to the spark gap assembly 230 illustrated by FIG. 5A, a first one of the spark gaps 145A-145C will spark over when a surge event induces a first spark over voltage $V_{AS1}$ across the spark gap assembly 230. Two of the three spark gaps 145A-145C will spark over when a surge event induces a second sparkover voltage $V_{AS2}$ across the spark gap assembly 230. All three of the spark gaps 145A-145C included in the spark gap assembly 230 will spark over when a third sparkover voltage $V_{AS3}$ is induced across the spark gap assembly 230.

$$V_{ASN} \approx \sqrt{\frac{V_{SN}^2}{V_{S(N+1)}^2}} \text{ at } f = f_0 \qquad \text{Equation 6}$$

$$V_{AS1} > V_{AS2} > V_{AS3} \ldots > V_{ASN} \text{ at } f \gg f_0 \qquad \text{Equation 7}$$

The use of a third spark gap segment 135C provides for a greater reduction in sparkover voltage as operating frequency of the power system 120 increases, such that $V_{AS1}$, $V_{AS2}$, and $V_{AS3}$ may all be reduced to between 40-50% of the value of $V_{AS1}(f=f_0)$ under sufficiently high rate of change of the voltage across the spark gap assembly 230. When the spark gap assembly 230 is subjected to a power surge, such as by lightning impulse, all three gaps 140A-140C will spark over in sequence such that the spark gap assembly voltage $V_A$ may remain below 40-50% of the value of $V_{AS1}(f=f_0)$.

As described above, a spark gap assembly is not limited in its construction to including only two or three spark gap segments. In some embodiments, a spark gap assembly, which is similar to the spark gap assemblies 130 and 230 described above, may include a plurality of N spark gap segments. In such embodiments, each of the N spark gap segments included in the spark gap assembly includes a respective spark gap and a grading circuit electrically connected in parallel with the respective spark gap. Equations 8 and 9 provided below define relationships that exist between various voltages within the spark gap assembly that includes a plurality of N spark gap segments.

As defined by Equation 8, the passive grading elements included in the grading circuits of the spark gap assembly are chosen such that the ratios between the voltage $V_N$ across a particular spark gap and the respective sparkover voltage $V_{SN}$ of that particular spark gap are approximately equivalent for all of spark gaps N included in the spark gap assembly when the spark gap assembly is operated at the normal operating frequency $f_0$. For example, the ratio of the voltage $V_1$ across the first spark gap to the sparkover voltage $V_{S1}$ of the first spark gap is approximately equivalent to the ratio of the voltage $V_N$ across the Nth spark gap to the sparkover voltage $V_{SN}$ of the Nth spark gap when spark gap assembly is operated at the normal operating frequency $f_0$.

$$\frac{V_1}{V_{S1}} \approx \frac{V_2}{V_{S2}} \approx \frac{V_3}{V_{S3}} \ldots \approx \frac{V_N}{V_{SN}} \text{ at } f = f_0 \qquad \text{Equation 8}$$

$$\frac{V_1}{V_{S1}} > \frac{V_2}{V_{S2}} > \frac{V_3}{V_{S3}} \ldots > \frac{V_N}{V_{SN}} \text{ at } f \gg f_0 \qquad \text{Equation 9}$$

$$V_{ASN} \approx \sqrt{\frac{V_{SN}^2}{V_{S(N+1)}^2}} \text{ at } f = f_0 \qquad \text{Equation 10}$$

$$V_{AS1} > V_{AS2} > V_{AS3} \ldots > V_{ASN} \text{ at } f \gg f_0 \qquad \text{Equation 11}$$

In addition, the passive grading elements included in the grading circuits of the spark gap assembly are chosen such that each sequential sparkover voltage $V_{ASN}$ of the spark gap assembly (e.g., $V_{AS1}$, $V_{AS2}$, $V_{AS3}$, ... $V_{ASN}$) is reduced during a high frequency surge event. That is, the first sparkover voltage $V_{AS1}$ of the spark assembly is greater than the second spark over voltage $V_{AS2}$, which is greater than the third sparkover voltage $V_{AS3}$, which is greater than the Nth sparkover voltage $V_{ASN}$ when the spark gap assembly is subjected to a high frequency (e.g., >1 kHz) surge event. In some embodiments, passive grading elements are chosen such that sparkover voltage during a high frequency (e.g., f>1 kHz) surge event is suppressed to less than 40% of the sparkover voltage during a surge event at normal operating frequency, (e.g., f=50–60 Hz).

In some embodiments, such as the exemplary embodiments described above, a spark gap assembly may be the only active component included in a surge arrester. In such embodiments, the surge arrester is capable of protecting against power surge events, such as lighting or switching surges, without the need for any metal oxide varistor (MOV) discs or other non-linear resistive components. In such embodiments, the passive grading elements included in the grading circuits of the spark gap assembly are protected from overvoltage duty by their respective spark gaps. Accordingly, surge arresters of such embodiments are not likely to fail because of an impulse duty. Furthermore, surge arresters of such embodiments are unlikely to experience thermal runaway failures because the respective impedances of the passive grading elements (e.g., resistors, capacitors, inductors, etc.) included in the grading circuits of the spark gap assembly are nearly independent of temperature.

In some embodiments, the spark gap assemblies described herein and/or illustrated in FIGS. 1-5 (e.g., spark gap assembly 130, spark gap assembly 230, and the spark gap assembly including N spark gap segments) may be implemented as a single component included in a surge arrester. The spark gap assembly may be electrically connected in series with one or more linear and/or nonlinear resistive components, such as MOV discs, that are included in a surge arrester. In such embodiments, the MOV discs provide the surge arrester with additional impedance during power surges that cause every spark gap included in the spark gap assembly to spark over. In addition, the MOV discs assist with resealing the spark gap assembly (e.g. clearing a short circuit fault) more rapidly than a spark gap assembly that is not electrically connected in series with MOV discs would be resealed. In addition, the MOV discs may assist with limiting the current through the surge arrester at maximum continuous operating voltage (MCOV).

Figure 6:
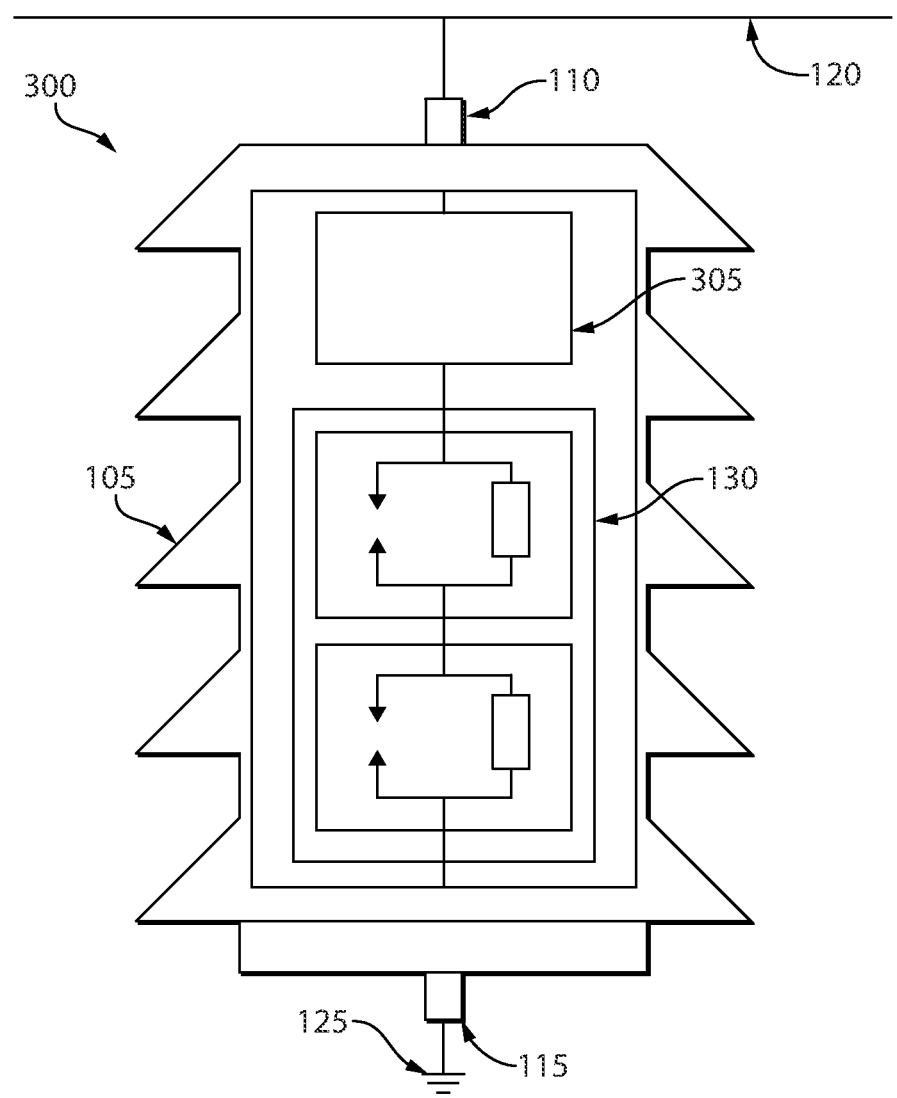
FIG. 6 illustrates a schematic diagram of an arrester according to some embodiments.
Figure 7:
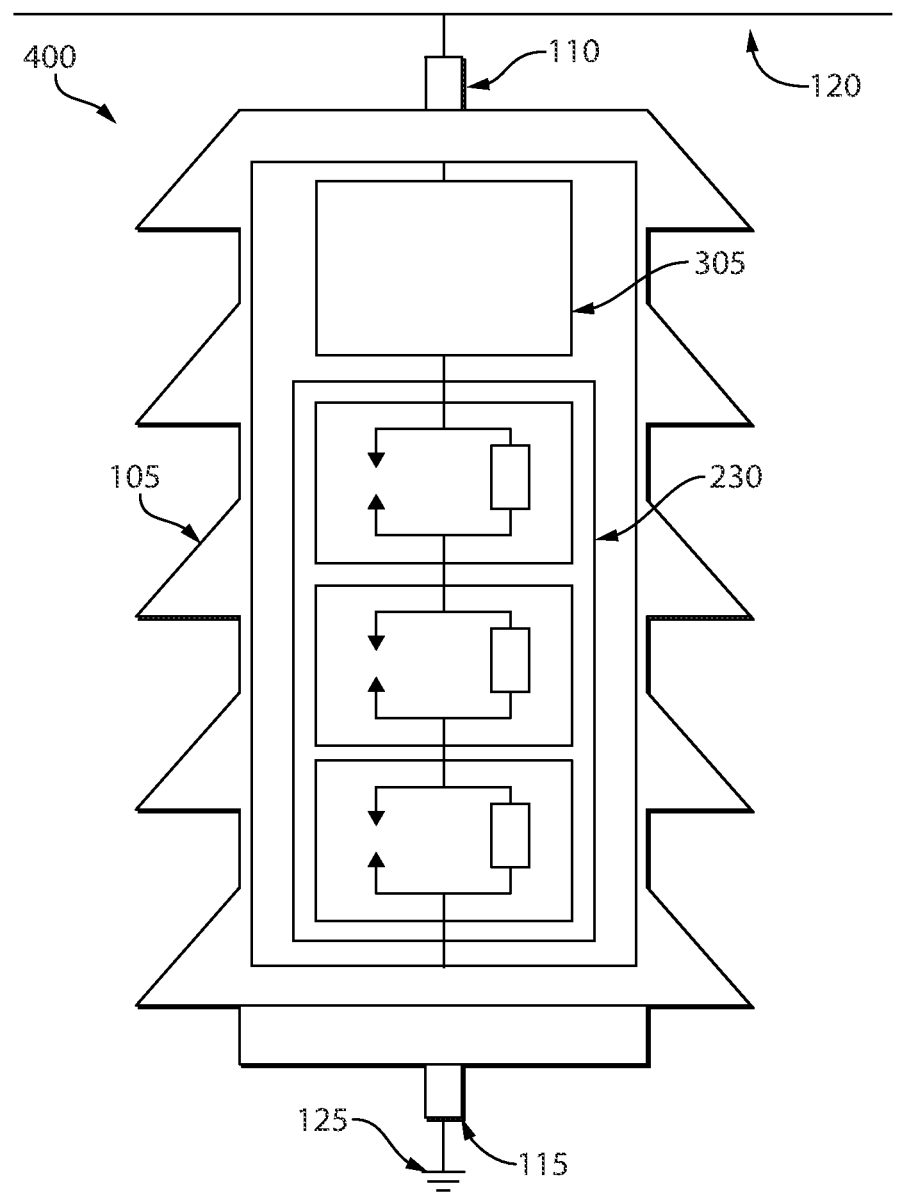
FIG. 7 illustrates a schematic diagram of an arrester according to some embodiments.

FIG. 6 illustrates an exemplary embodiment of a surge arrester 300. The surge arrester 300 is similar in construction to the surge arrester 100 described herein; however, the surge arrester 300 additionally includes a stack of MOV discs, or MOV stack, 305 that is electrically connected in series with the spark gap assembly 130. Similarly, FIG. 7 illustrates an exemplary embodiment of a surge arrester 400. The surge arrester 400 is similar in construction to the surge arrester 200 described herein; however, the surge arrester 400 additionally includes an MOV stack 305 that is electrically connected in series with the spark gap assembly 230. In some embodiments, a surge arrester includes an MOV stack that is electrically connected in series with the spark gap assembly that includes a plurality of N spark gap segments described herein.

Figure 8:
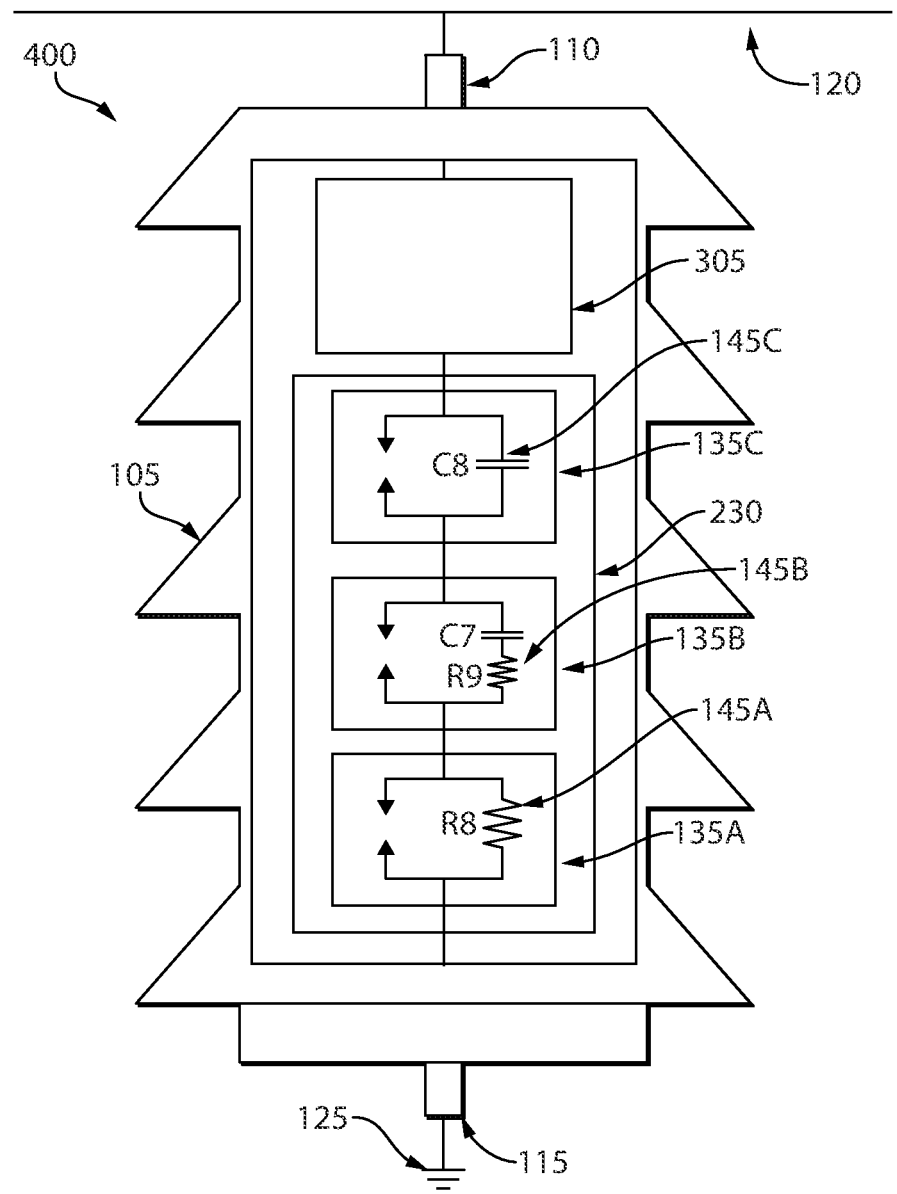
FIG. 8 illustrates an exemplary configuration of the arrester of FIG. 7.

FIG. 8 illustrates an exemplary schematic of surge arrester 400, which includes an MOV stack 305 electrically connected in series with the spark gap assembly 230. The configuration of spark gap assembly 230 shown in FIG. 8 is the same as the configuration of spark gap assembly 230 shown in FIG. 5A. As shown in FIG. 8, the spark gap assembly 230 includes a first spark gap segment 135A, a second spark gap segment 135B, and a third spark gap segment 135C. The first spark gap segment 135A includes a first spark gap 140A that is electrically connected in parallel, or graded by, a capacitor C8. The second spark gap segment 135B includes a second spark gap 140B that is graded by the series combination of capacitor C7 and resistor R8. The third spark gap segment 135C includes a third spark gap 140C that is graded by a resistor R8.

When designing a spark gap assembly that is to be electrically connected in series with an MOV stack, values for the passive circuit elements (e.g., resistors, capacitors, inductors, etc.) included in the grading circuits are selected such that a total impedance of the spark gap assembly increases after a power surge passes. An increase in total impedance of the spark gap assembly minimizes the amount of time needed to re-seal the individual spark gaps of the spark gap assembly and minimizes the length of time during which hazardous arcing occurs. Thus, surge arresters that include spark gap assemblies electrically connected in series with an MOV stack provide significant performance benefits when used in areas of high fire hazard.

Figure 9:
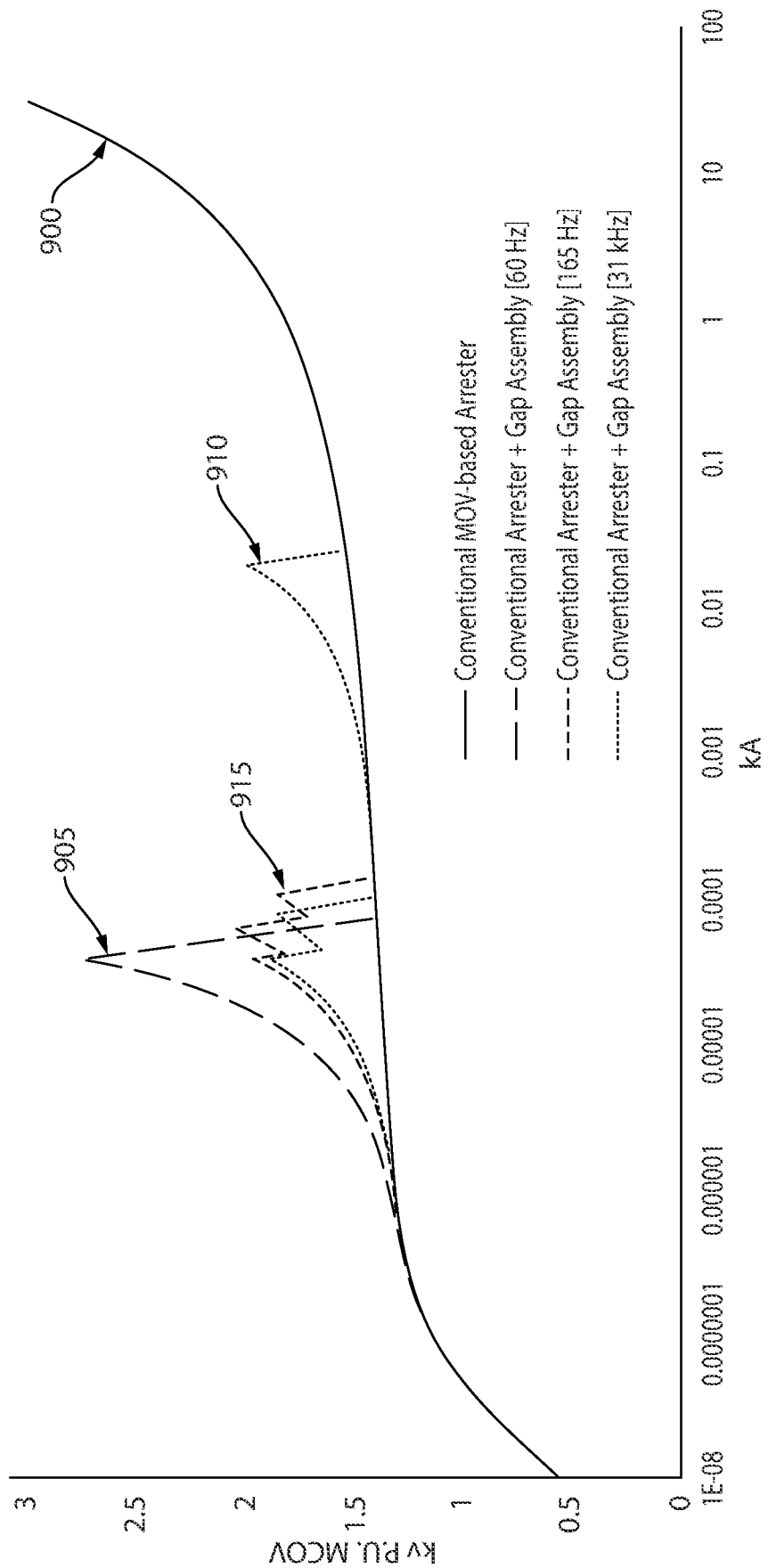
FIG. 9. illustrates a voltage-current behavior of the arrester of FIG. 8.

FIG. 9 illustrates a graph of an exemplary voltage-current (V-I) behavior of the surge arrester 400 illustrated by FIG. 8. In particular, FIG. 9 illustrates a comparison between the V-I behavior of the surge arrester 400 at various operating frequencies and the V-I behavior of a standard MOV-based surge arrester that does not include a spark gap assembly. In this example, the surge arrester 400 is configured such that R8=150 kiloohms, R9=75 kiloohms, C7=17.7 nano-farads, and C8=17.7 nano-farads. In addition, in this example, the surge arrester 400 is configured such that the first spark gap 140A, the second spark gap 140B, and the third spark gap 140C each have a spark over voltage that is equivalent to 0.47 per unit of the maximum continuous operation voltage of surge arrester 400.

In FIG. 9, the voltage of the surge arrester 400 is represented as a per unit value of the surge arrester's maximum continuous operating voltage (P.U. MCOV). As shown by a first curve 900 in FIG. 9, a conventional MOV-based arrester that does not include a spark gap assembly a protective voltage level of 2.4 P.U. MCOV at 10 kA, regardless of the operating frequency of the conventional MOV-based arrester.

In contrast, the protective voltage level of surge arrester 400 is frequency dependent. As shown by a second curve 905 in FIG. 9, the surge arrester 400 can withstand 2.75 P.U. MCOV without gap sparkover when operated at 60 Hz frequency ($f=f_0$). Furthermore, while operating at 60 Hz, the surge arrester 400 can withstand much greater levels of overvoltage when compared to the conventional MOV-based arrester.

Behavior of the surge arrester 400 while subjected to a lighting impulse, which is modeled as a 31 kHz impulse signal, is represented by a third curve 910 in FIG. 9. Under the lighting impulse, the surge arrester 400 does not exceed 2 P.U. MCOV before the spark gap assembly 230 completely sparks over. Therefore, the spark gap assembly 230 does not interfere with the 2.4 P.U. MCOV protective level provided by the conventional MOV-based arrester for a typical lighting impulse current of 10 kA.

Behavior of the surge arrester 400 while subjected to a switching surge encountered on high voltage power lines, which is modeled as a 165 Hz signal, is represented by a fourth curve 915. Under the switching surge condition, maximum voltage across the spark gap assembly 230 is encountered at the second sparkover point, which reaches a level of 2.05 P.U.

In some instances, it may be desirable to provide the protection offered by spark gap assemblies described herein to pre-existing and/or new surge arresters that do not include their own spark gap assemblies. Accordingly, in some embodiments, the spark gap assemblies described herein and/or illustrated in FIGS. 1-8 (e.g., spark gap assembly 130, spark gap assembly 230, and the spark gap assembly including N spark gap segments) may be included in an accessory device that is configured to be electrically connected in series with surge arresters that do not include their own spark gap assemblies.

Figure 10:
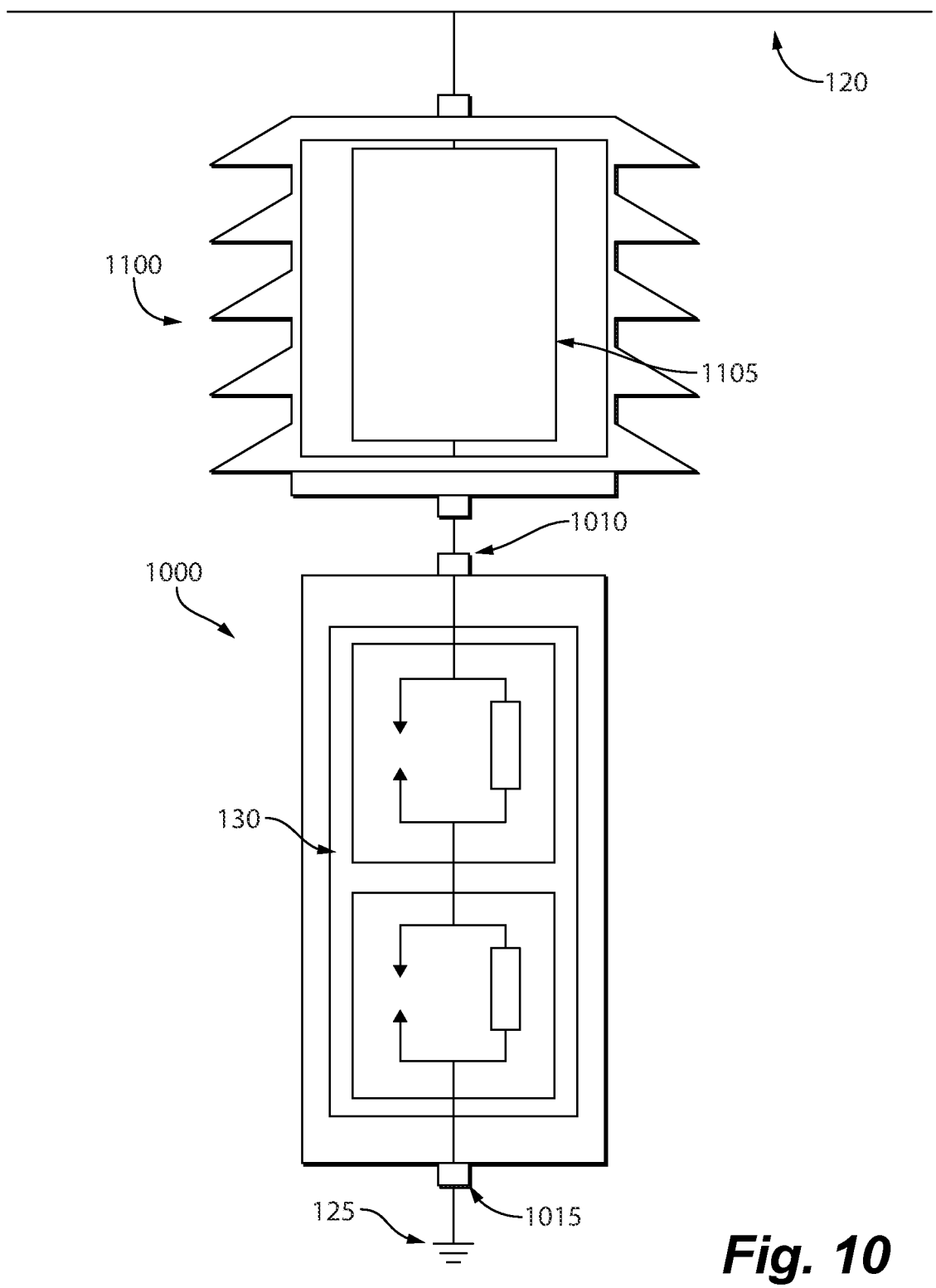
FIG. 10 illustrates an accessory device according to some embodiments.
Figure 11:
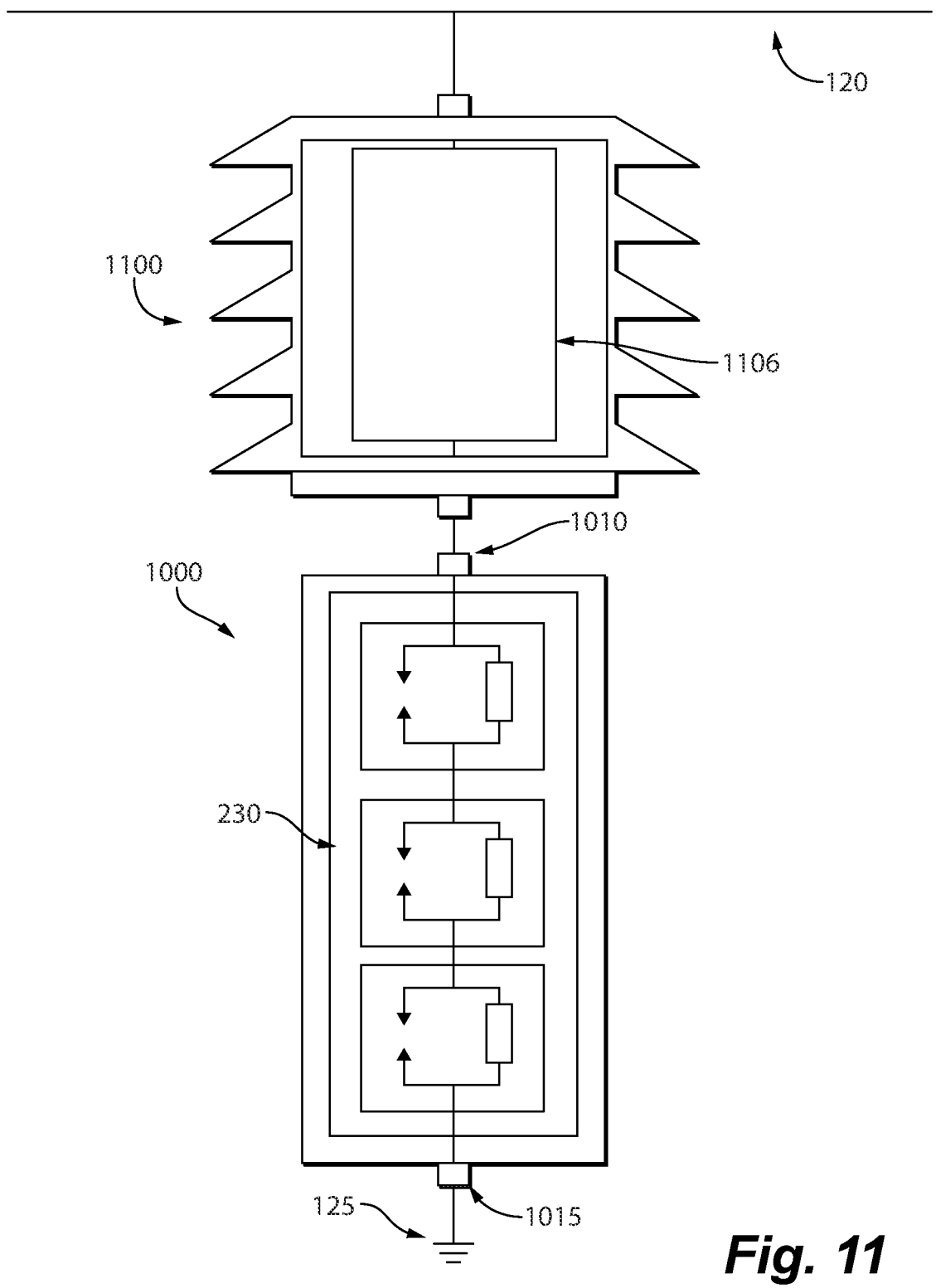
FIG. 11 illustrates an accessory device according to some embodiments.

FIGS. 10 and 11 illustrate exemplary embodiments of a spark gap assembly accessory device 1000. The accessory device 1000 includes a housing 1005, a first stud 1010 extending from an upper portion of the housing 1005, and a lower stud 1015 extending from a lower portion of the housing 1005. The first stud 1010 electrically connects the accessory device 1000 to a surge arrester 1100 that does not include its own spark gap assembly. For example, the surge arrester 1100 may be a conventional MOV-based arrester that includes one or more resistive components, such as an MOV stack 1105, but does not include a spark gap assembly. The second stud 1015 electrically connects the accessory device 1000 to ground 125. The housing 1005 of the accessory device 1000 may be, for example, made of any suitable material, such as, but not limited to, ceramic, glass, and/or nylon FIG. 10 illustrates an embodiment of an accessory device 1000 that includes the spark gap assembly 130 described herein. Similarly, FIG. 11 illustrates an exemplary embodiment of an accessory device that includes the spark gap assembly 230 described herein. In some embodiments, the accessory device 1000 may include the spark gap assembly that includes a plurality of N spark gap segments described herein.

Thus, the disclosure provides, among other things, a spark gap assembly included in surge arresters. Various features and advantages of the application are set forth in the following claims.

What is claimed is:

1. A spark gap assembly comprising: a first spark gap segment including: a first spark gap; and a first grading circuit electrically connected in parallel with the first spark gap; and a second spark gap segment electrically connected in series with the first spark gap segment, the second spark gap segment including: a second spark gap; and a second grading circuit electrically connected in parallel with the second spark gap, wherein a first ratio of a voltage across the first spark gap to a sparkover voltage of the first spark gap is substantially equal to a second ratio of a voltage across the second spark gap to a sparkover voltage of the second spark gap when the spark gap assembly is operated at a first operating frequency.

2. The spark gap assembly of claim 1, wherein the spark gap assembly is electrically connected in series with a metal oxide varistor (MOV).

3. The spark gap assembly of claim 1, wherein the first grading circuit includes at least one selected from the group consisting of a resistor, a capacitor, and an inductor; and
the second grading circuit includes at least one selected from the group consisting of a resistor, a capacitor, and an inductor.

4. The spark gap assembly of claim 1, wherein the spark gap assembly is included in an accessory device that is electrically connected in series with a surge arrester.

5. The spark gap assembly of claim 1, wherein the first operating frequency is 60 Hz.

6. The spark gap assembly of claim 1, wherein the first ratio is greater than the second ratio when the spark gap assembly is operated at a second frequency greater than the first operating frequency.

7. The spark gap assembly of claim 1 further comprising:
a third spark gap segment electrically connected in series with the first spark gap segment and the second spark gap segment, the third spark gap segment including:
a third spark gap; and
a third grading circuit electrically connected in parallel with the third spark gap.

8. The spark gap assembly of claim 1, wherein a first sparkover voltage of the spark gap assembly is frequency dependent.

9. The spark gap assembly of claim 1, wherein the first grading circuit and the second grading circuit include impedance elements connected in series without any parallel impedance elements.

10. An arrester comprising: a spark gap assembly including: a first spark gap segment including: a first spark gap; and a first grading circuit electrically connected in parallel with the first spark gap; and a second spark gap segment electrically connected in series with the first spark gap segment, the second spark gap segment including: a second spark gap; and a second grading circuit electrically connected in parallel with the second spark gap, wherein a first ratio of a voltage across the first spark gap to a sparkover voltage of the first spark gap is substantially equal to a second ratio of a voltage across the second spark gap to a sparkover voltage of the second spark gap when the spark gap assembly is operated at a first operating frequency.

11. The arrester of claim 10 further comprising a metal oxide varistor (MOV) that is electrically connected in series with the spark gap assembly.

12. The arrester of claim 10, wherein the first grading circuit includes at least one selected from the group consisting of a resistor, a capacitor, and an inductor; and
the second grading circuit includes at least one selected from the group consisting of a resistor, a capacitor, and an inductor.

13. The arrester of claim 10, wherein the first operating frequency is 60 Hz.

14. The arrester of claim 10, wherein the first ratio is greater than the second ratio when the spark gap assembly is operated at a second frequency greater than the first operating frequency.

15. The arrester of claim 10, wherein spark gap assembly further includes:
a third spark gap segment electrically connected in series with the first spark gap segment and the second spark gap segment, the third spark gap segment including:
a third spark gap; and
a third grading circuit electrically connected in parallel with the third spark gap.

16. The arrester of claim 10, wherein a first sparkover voltage of the spark gap assembly is frequency dependent.

17. The arrester of claim 10, wherein the first grading circuit includes an resistor and the second grading circuit includes a capacitor and wherein under normal operating conditions equal amounts of current flow through the resistor and the capacitor.

18. An accessory device electrically connected in series with an arrester, the accessory device comprising: a spark gap assembly including: a first spark gap segment including: a first spark gap; and a first grading circuit electrically connected in parallel with the first spark gap; and a second spark gap segment electrically connected in series with the first spark gap segment, the second spark gap segment including: a second spark gap; and a second grading circuit electrically connected in parallel with the second spark gap, wherein a first ratio of a voltage across the first spark gap to a sparkover voltage of the first spark gap is substantially equal to a second ratio of a voltage across the second spark gap to a sparkover voltage of the second spark gap when the spark gap assembly is operated at a first operating frequency.

19. The accessory device of claim 18, wherein the arrester includes a metal oxide varistor (MOV) disc.

20. The accessory device of claim 18, wherein spark gap assembly further includes:
a third spark gap segment electrically connected in series with the first spark gap segment and the second spark gap segment, the third spark gap segment including:
a third spark gap; and
a third grading circuit electrically connected in parallel with the third spark gap.

21. The accessory device of claim 18, wherein the arrester does not include a spark gap.

22. The accessory device of claim 18, wherein a first sparkover voltage of the spark gap assembly is frequency dependent.

23. The accessory device of claim 18, wherein the first grading circuit includes a first impedance element and the second grading circuit includes a second impedance element and wherein under normal operating conditions equal amounts of current flow through the first impedance element and the second impedance element.

* * * * *